Jan. 27, 1942.  C. F. W. BORGWARD  2,271,246
MOTOR VEHICLE BODY
Filed Dec. 15, 1938  2 Sheets-Sheet 1

Inventor:
Carl Friedrich Wilhelm Borgward,
by Frank S. Ackerman,
Attorney.

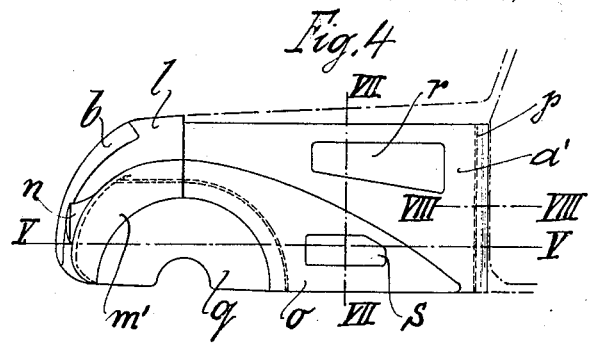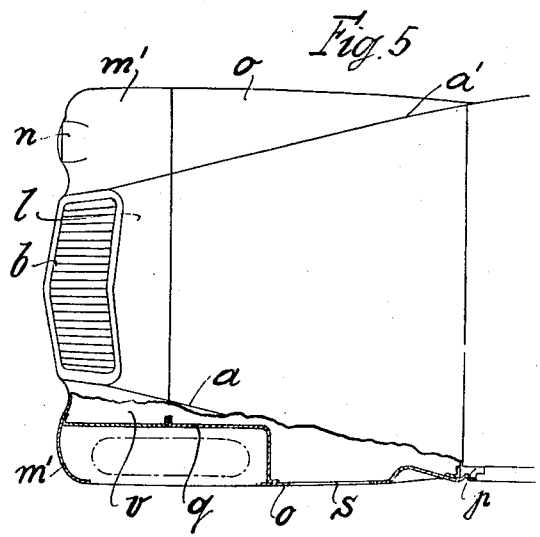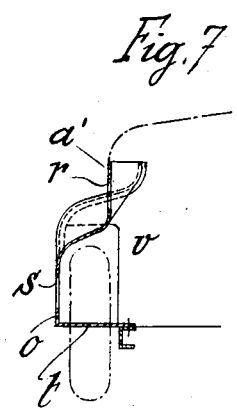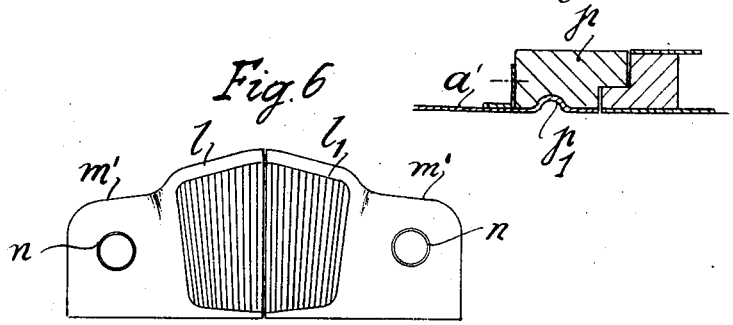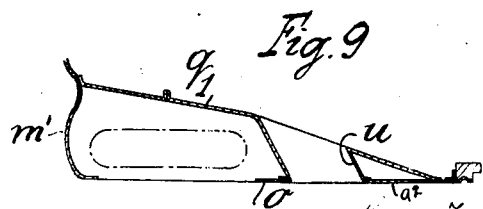

Patented Jan. 27, 1942

2,271,246

UNITED STATES PATENT OFFICE 2,271,246

MOTOR VEHICLE BODY

Carl Friedrich Wilhelm Borgward, Bremen, Germany

Application December 15, 1938, Serial No. 245,996

1 Claim. (Cl. 180—69)

Motor vehicle bodies are known having upwardly curved lateral walls which are connected at their upper part with the radiator frame. A bonnet is also known of which the lateral walls are connected by the radiator frame. Finally a bonnet top is known wherein the bonnet is connected to the radiator screen. In none of these constructions, however, does the radiator screen form a support for the body.

On the other hand the present invention consists in a body wherein the front wall thereof is carried over the radiator of the motor vehicle to provide a radiator screen therefor, the radiator screen being adapted to serve as a transverse reinforcing wall for the lateral walls of the body, the bonnet top lying flush against said lateral walls.

According to this construction it is not the radiator frame which supports the body but the radiator screen, while the radiator is protected behind the screen and is not affected by stresses on the body. The radiator may if desired be suspended in known manner with the engine for example by means of rubber in order to protect the vital parts. Upon damage to the body it is not necessary to exchange the radiator or radiator frame.

A further feature of the invention consists in that the front part of the bonnet with the radiator screen and the front parts of the mudguard form a single stamped out part which extends to a point over the centre of the front axle and in which the headlight sockets are formed, while the rear parts of the mudguard together with the rear lateral walls of the bonnet are formed in one stamped out part which extends from a point over the centre of the front axle to the front door pillars and is removably secured to the body.

By this construction the production of the body is simplified and made more economical. In case of damage only a part of the mudguard need be removed so that repairs can be carried out on the bench. Furthermore, the body becomes strengthened in the longitudinal direction between the door pillars and the front of the bonnet, and the front mudguards are also thereby strengthened.

The invention is illustrated by way of example in the accompanying drawings in which:

Fig. 4 is a side elevation of a modification;

Fig. 5 is a plan of Fig. 4 in part section on the line V—V;

Fig. 6 is a front elevation of a further embodiment;

Fig. 7 is a section on VII—VII of Fig. 4;

Fig. 8 is a section on a larger scale on VIII—VII of Fig. 4;

Fig. 9 is a plan view of a further embodiment.

Figure 1:
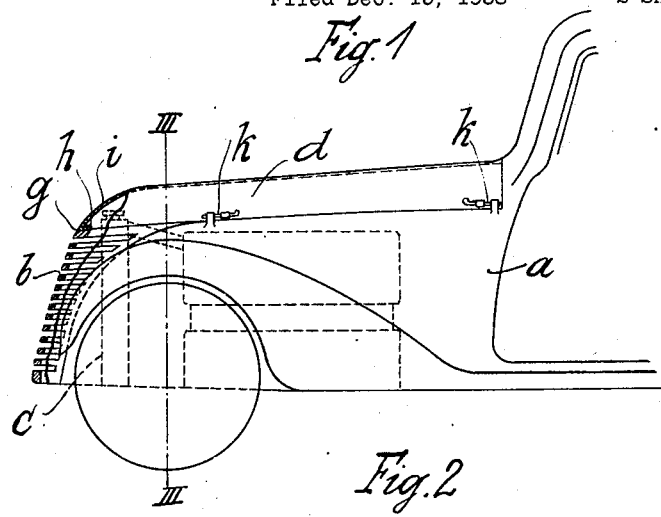
Fig. 1 is a side elevation of the bonnet of a motor vehicle including a portion of the tonneau.
Figure 2:
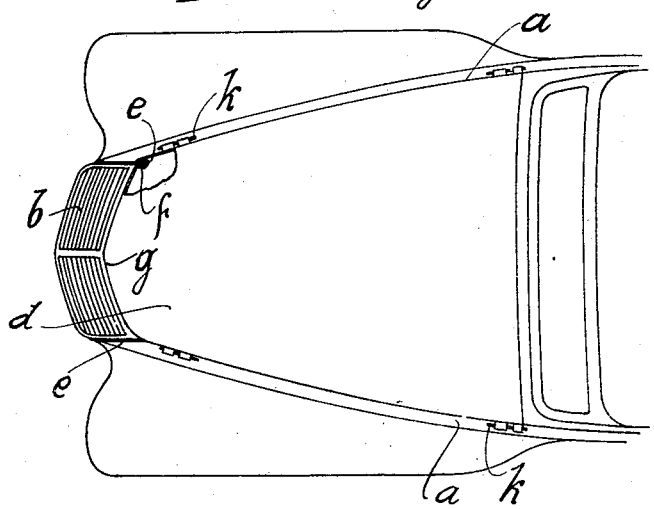
Fig. 2 is a plan of Fig. 1.

Referring to the drawings in which like reference numerals denote like parts, the lateral walls $a$ (Figs. 1-3) of the bonnet of a motor vehicle body comprise, as shown, integral forward extensions of the side walls of the tonneau and are connected directly to the radiator screen $b$ which guards the radiator $c$. On the said screen is directly supported the bonnet top $d$ which may be formed in more than one part. The front edges $e$ of the lateral walls $a$ lie flush against the screen $b$ which is fixed ahead of the walls for example by means of flanges $f$. In this way the radiator screen $b$ forms the front wall of the body.

The bonnet top $d$ lies on the upper edge of the radiator screen so that their contact surfaces $g$ as seen from the front is substantially horizontal. Flanges $h$ are provided at these surfaces between which sealing strips may be provided if desired.

Figure 3:
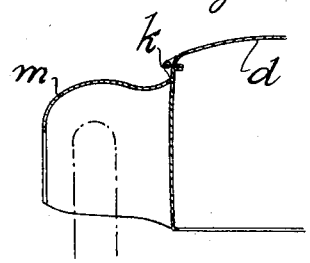
Fig. 3 is a section along the line III—III of Fig. 1.

The bonnet top $d$ is curved or arched downwardly in front at $i$, and the bonnet top may also be curved laterally in the usual manner (Fig. 3). The upper edges of the radiator screen $b$ and the edges of the lateral walls $a$ preferably lie in the same plane so that a smooth continuous boundary is formed. The bonnet top $d$ is secured to the lateral walls by bolts $k$ serving simultaneously as hinges so that when the bolts on one side are withdrawn the bonnet top can be swung over to the opposite side. Alternatively by removing all the bolts which may be spring pressed and adapted to be locked in retracted position, the bonnet top may be completely removed. The mud guards $m$ are attached to the side walls $a$ of the bonnet, as shown in Fig. 3.

The bonnet top may also be secured laterally to the lateral parts $a$ by providing the latter with recesses in known manner.

In the embodiment shown in Figs. 4, 5, 7 and 8 the front portion $l$ of the hood or bonnet is formed integral with the front parts of the mudguards $m'$ in one stamped out piece extending to a point over the centre of the front axle.

The rear part $o$ of the mudguard and the lateral walls $a'$ of the bonnet are also formed in one stamped out piece extending from a point over the centre of the front axle to the front door pillar $p$ and is removably secured to the body. The end of the lateral wall $a'$ forms part of the door frame and may be provided with a flange $p_1$ (Fig. 8) formed as a water channel.

The wheel shield $q$ is secured to the mudguard part $o$ and if desired it may form one stamped out piece with the part $o$ and also with the wall $a'$. Alternatively the wheel shield $q$ may also be integral with the front part $l$ of the bonnet. The wall $a'$ may be secured to the frame, for example to the door pillar by screwing or the like.

As shown in Figs. 4 and 7 the lateral wall $a'$ is provided with one or more stamped out aerating apertures $r$ which may be provided with valves or ventilators. The rear part $o$ of the mudguard may also be provided with aerating apertures $s$ for the engine chamber $v$. For this purpose the mudguard is provided on its lower part behind the wheel with a sealing surface $t$. The hollow space so formed which is accessible from the engine chamber may be used for accommodating accessories (Fig. 7).

As shown in Fig. 4, the headlight sockets $n$ may be stamped out directly from the mudguard.

In Fig. 9 the lateral wall $a^2$ of which the extension $q_1$ forms the wheel shield is provided with channels $u$ which may if desired be closable by valves or ventilators.

In this way a good aeration of the engine chamber is obtained.

The front wall may, as shown in Fig. 6, be formed of two symmetrical complementary stampings $l$, $l_1$, connected flush together along the centre of the wall for example by means of a flange.

The above described construction enables the lateral walls and mudguards to be easily removable when desired, for example in case of damage. The radiator is also easily accessible from the front and good reinforcement is obtained between the bonnet and the front door pillar.

I claim:

A forward motor hood for vehicle bodies in which the forwardly carried side walls of the hood are rigidly connected to the mudguard and are directly stiffened or supported by the frame of the radiator screen, the side walls and the radiator screen providing a support for the hood cover which can be folded up high, and in which the side of the mudguard is made from one piece with the mudguard rear parts provided with channels forming aerating openings extending from the outer mudguard wall to the inner side wall without allowing the whirled up dust under the mudguard to penetrate the motor chamber.

CARL FRIEDRICH WILHELM BORGWARD.